(12) United States Patent
Green et al.

(10) Patent No.: US 8,871,099 B1
(45) Date of Patent: Oct. 28, 2014

(54) COAL SLURRY DEWATERING ARRANGEMENT

(71) Applicants: Fred H. Green, Paola, KS (US); Raymond A Miller, Paola, KS (US)

(72) Inventors: Fred H. Green, Paola, KS (US); Raymond A Miller, Paola, KS (US)

(73) Assignee: Nu-Coal LLC, Paola, KS (US)

( * ) Notice: Subject to any disclaimer, the term of this patent is extended or adjusted under 35 U.S.C. 154(b) by 0 days.

(21) Appl. No.: 13/646,934

(22) Filed: Oct. 8, 2012

Related U.S. Application Data

(60) Provisional application No. 61/548,680, filed on Oct. 18, 2011.

(51) Int. Cl.
*B01D 37/00* (2006.01)
*B01D 33/04* (2006.01)
*B30B 9/02* (2006.01)
*C10L 9/00* (2006.01)

(52) U.S. Cl.
USPC ........ 210/770; 210/783; 210/401; 210/502.1; 44/626; 100/118

(58) Field of Classification Search
None
See application file for complete search history.

(56) References Cited

U.S. PATENT DOCUMENTS

| | | | | |
|---|---|---|---|---|
| 1,986,897 A * | 1/1935 | Shaw | | 210/748.01 |
| 2,176,902 A * | 10/1939 | Horrocks | | 34/340 |
| 2,207,278 A * | 7/1940 | Albrecht | | 34/95 |
| 3,018,563 A * | 1/1962 | Bridges et al. | | 34/95 |
| 3,204,764 A * | 9/1965 | Prins | | 209/18 |
| 3,338,411 A * | 8/1967 | Von Der Gathen et al. | | 210/742 |
| 3,361,259 A * | 1/1968 | Von Der Gathen et al. | | 210/771 |
| 3,552,031 A * | 1/1971 | Evans et al. | | 34/349 |
| 3,601,039 A * | 8/1971 | Schover | | 100/118 |
| 3,669,011 A * | 6/1972 | Jacquelin | | 100/118 |
| 3,982,052 A * | 9/1976 | Bearce | | 44/501 |
| 4,011,623 A * | 3/1977 | Pabst et al. | | 15/309.1 |
| 4,208,188 A * | 6/1980 | Dick, Jr. | | 44/596 |
| 4,285,816 A * | 8/1981 | Lee | | 210/401 |
| 4,330,413 A * | 5/1982 | Wilson | | 210/806 |
| 4,347,137 A * | 8/1982 | Dick, Jr. | | 210/329 |
| 4,371,376 A * | 2/1983 | Dick, Jr. | | 210/767 |
| 4,475,453 A * | 10/1984 | Davis | | 100/118 |
| 4,477,358 A * | 10/1984 | Heintges et al. | | 210/783 |
| 4,526,121 A * | 7/1985 | Shudo et al. | | 114/73 |
| 4,544,490 A * | 10/1985 | Erickson et al. | | 210/713 |
| 4,662,894 A * | 5/1987 | Greenwald, Sr. | | 44/280 |
| 4,681,033 A * | 7/1987 | Crandall et al. | | 100/118 |
| 4,961,862 A * | 10/1990 | Janecek | | 210/778 |
| 5,236,596 A * | 8/1993 | Greenwald, Sr. | | 210/696 |
| 5,413,703 A * | 5/1995 | Greenwald, Sr. | | 210/205 |
| 5,462,425 A * | 10/1995 | Kuss et al. | | 425/183 |
| 5,795,484 A * | 8/1998 | Greenwald, Sr. | | 210/696 |
| 5,862,746 A * | 1/1999 | Bielfeldt | | 100/73 |
| 6,544,425 B2 * | 4/2003 | Miller | | 210/710 |
| 7,381,329 B1 * | 6/2008 | Moss | | 210/255 |
| 7,383,766 B2 * | 6/2008 | McIntosh et al. | | 100/92 |
| 7,571,816 B2 * | 8/2009 | Osborne et al. | | 209/243 |
| 7,964,105 B2 * | 6/2011 | Moss | | 210/770 |
| 8,092,691 B2 * | 1/2012 | Youngs et al. | | 210/783 |
| 8,286,801 B2 * | 10/2012 | Youngs et al. | | 210/400 |
| 2002/0139754 A1 * | 10/2002 | Miller | | 210/726 |

(Continued)

*Primary Examiner* — Robert James Popovics
(74) *Attorney, Agent, or Firm* — Camoriano and Associates

(57) ABSTRACT

A coal slurry dewatering arrangement includes a filter belt press with a filter belt having first and second sides, the first side being water-impermeable and the second side having pores and being water-permeable, wherein the water-permeable side includes a layer of water-absorbent material.

2 Claims, 3 Drawing Sheets

(56) References Cited

U.S. PATENT DOCUMENTS

| | | | |
|---|---|---|---|
| 2003/0146167 A1* | 8/2003 | Miller | 210/710 |
| 2004/0237809 A1* | 12/2004 | McIntosh et al. | 100/117 |
| 2007/0151147 A1* | 7/2007 | Learey et al. | 44/620 |
| 2007/0215527 A1* | 9/2007 | Osborne | 209/404 |
| 2010/0025306 A1* | 2/2010 | Osborne et al. | 209/235 |
| 2010/0032384 A1* | 2/2010 | Moss | 210/770 |
| 2010/0224574 A1* | 9/2010 | Youngs et al. | 210/783 |
| 2011/0089122 A1* | 4/2011 | Smith | 210/774 |
| 2012/0103893 A1* | 5/2012 | Youngs et al. | 210/359 |
| 2013/0233778 A1* | 9/2013 | Moss | 210/91 |

* cited by examiner

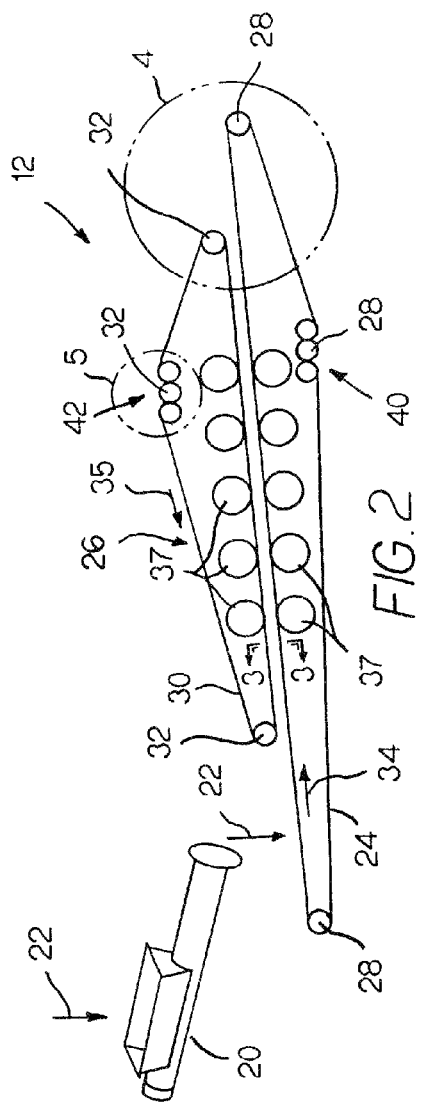
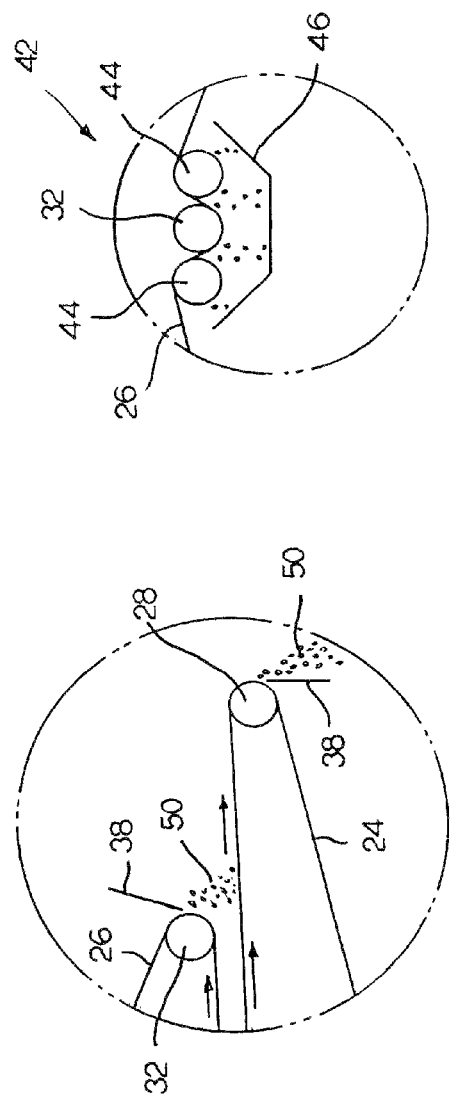

COAL SLURRY DEWATERING ARRANGEMENT

This application claims priority from U.S. Provisional Application Ser. No. 61/548,680, filed Oct. 18, 2011. The present invention relates to a coal slurry dewatering arrangement. In particular, it relates to a filter belt arrangement for use in dewatering a coal slurry.

BACKGROUND

Coal slurries are made up of very small particles of coal suspended in water. The particle diameter is typically in the range of 30-90 µm. These slurries present disposal problems for coal mines as well as creating environmental hazards. The purpose of the present invention is to provide an economical method for dewatering the coal slurry in order to be able to substantially reduce or eliminate the waste problem and to be able to put the dried coal particles to use for various beneficial purposes.

Prior art arrangements for dewatering of slurries involve filtration, primarily obtained by passing a pair of filtering cloths and belts through a system of rollers. The feed slurry is introduced between the two filter cloths, which are supported by perforated belts that allow water to fall through the belts. As the belts pass through the rollers, the water is squeezed out of the slurry. After the last set of rollers, the belts are separated and the filter cake is scraped off before the belts are washed by means of water sprays positioned on the return section of the belts.

Since the slurry is in direct contact with the filtering cloths, the cloths tend to become clogged with solids. Eventually, the cleaning with the water sprays fails to clean the filtering cloths sufficiently and they become blinded and must be replaced. A substantial amount of clean water is used for washing the filtering cloths, and this water becomes contaminated with the residual slurry on the filtering cloths and creates an additional waste disposal problem.

SUMMARY

One embodiment described herein includes a belt filter with upper and lower belts, wherein the coal slurry is trapped between the two belts. Each belt has a cross-sectional profile with three layers. On a first side of the belt is a porous belt layer. On a second side of the belt is a non-porous belt layer. Between the porous belt layer and the non-porous belt layer is an absorbent belt layer. In operation, the coal slurry is placed in contact with the porous belt layer on the first side of the belt.

As a result of this arrangement, the coal slurry only contacts the porous belt layer. Water from the slurry migrates through this porous belt layer, while the coal slurry solids are "filtered out" and remain on the surface of the porous belt layer where they form a coal slurry cake. The moisture that does get through the porous belt layer is absorbed by the adjacent, absorbent belt layer.

As the belts are fed through the rollers, more of the water is squeezed through the porous belt layer and absorbed by the absorbent belt layer. After the final set of pressure rollers in the process, the slurry cake resting on the surface of the porous belt layer is scraped away and the belts proceed to a wringing station wherein all three layers of each belt are squeezed together to extract the moisture from the absorbent belt layer. At this point, the moisture content of the slurry cake has been reduced from the initial moisture content of about 50% to a moisture content of about 20-25%.

As the belt is squeezed, the absorbed water cannot escape through the non-porous belt layer, as this layer is made from an impermeable material. The primary avenue available for the water to be expelled is by going back through the porous belt layer, wherein the absorbed water backwashes and cleans the porous belt layer. The particles resting on the porous belt layer are pushed back out in a direction that is opposite to the direction in which they entered (backwashed). The water which is used for backwashing is the same water that was removed from the coal slurry (instead of fresh, clean water), resulting in substantial water savings and substantial reduction in waste in the process.

BRIEF DESCRIPTION OF THE DRAWINGS

FIG. 2 is a schematic of the belt filter portion of FIG. 1;

FIG. 4 is an enlarged view of the slurry cake scraping stations of the belt filter of FIG. 2; and FIG. 5 is an enlarged view of one of the wringing stations of the belt filter of FIG. 2.

DESCRIPTION

Figure 1:
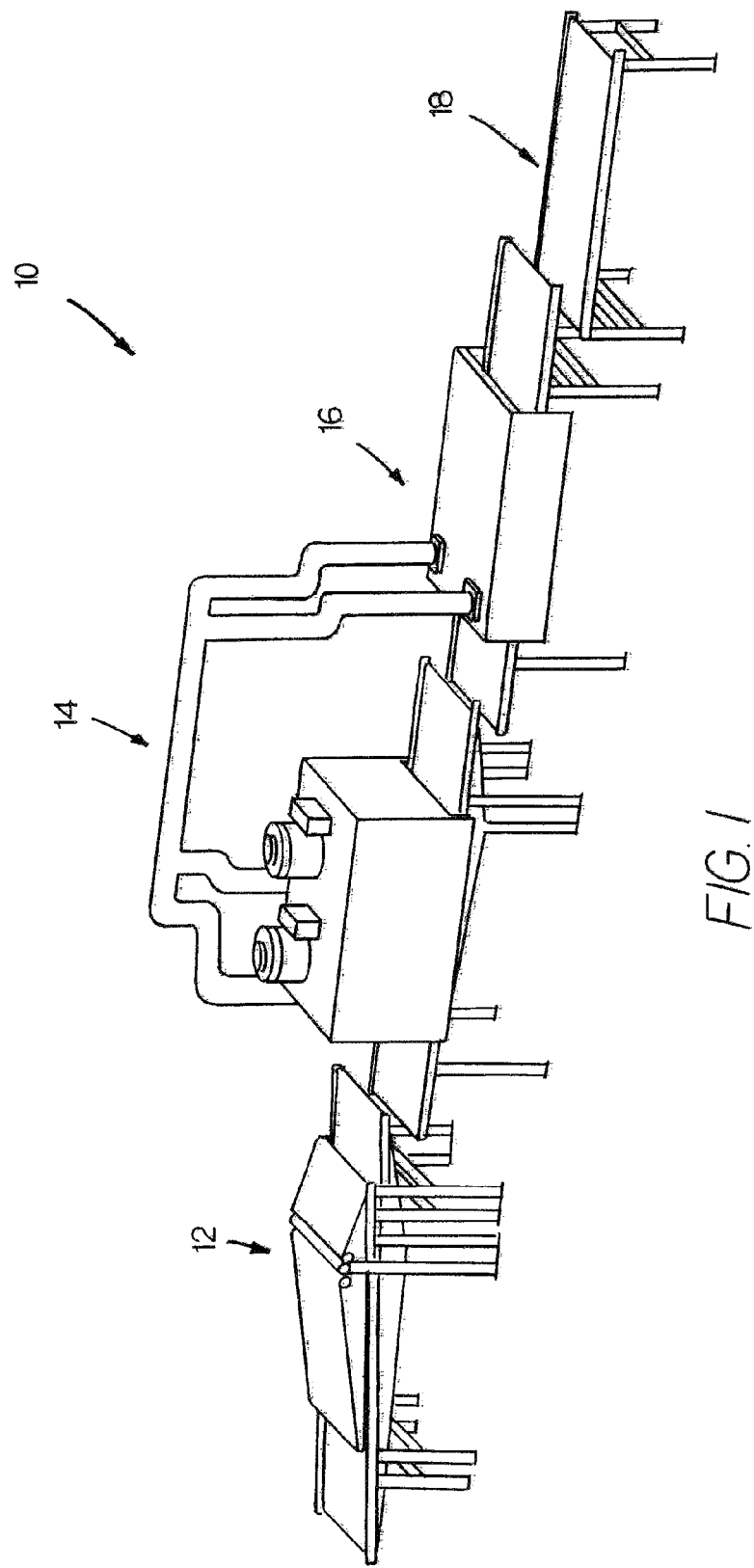
FIG. 1 is a schematic of a coal slurry dewatering facility including an example of a filter arrangement made in accordance with the present invention.

FIG. 1 shows a four-stage coal slurry dewatering process arrangement 10 including a filtration stage 12, a microwave heating stage 14, a steam jacketed drying stage 16, and a convection drying stage 18.

Very briefly, the coal slurry is first deposited on a belt filter press 12 for initial dewatering, as explained in more detail later. The coal cake exiting the filtration stage 12 is then transported by a conveyor belt through a microwave heating chamber 14 where the coal is heated, opening up microscopic pores and fissures to allow the steam generated in the heating process to escape the coal cake. This steam is recycled to the steam jacketed drying stage 16 where the latent heat of vaporization, released by the steam as it condenses on the jacketed wall of the vessel, is used to further heat the coal before it is transferred to the last stage. In the convection drying stage 18, conventional heating is used to drive out the last bit of moisture required to reach the desired degree of moisture in the coal.

Referring to FIG. 2, in the filtration stage 12, a hopper 20 meters coal slurry, denoted by the arrows 22, onto the lower belt 24 of the filter press 26. The lower belt 24 is driven around a continuous loop by one or more motorized rollers 28. An upper belt 30 is similarly driven around a continuous loop by one or more motorized rollers 32.

As the lower belt 24 is driven in the direction of the arrow 34 (clockwise direction), and the upper belt 30 is driven in the direction of the arrow 35 (counterclockwise direction), the coal slurry progresses between a plurality of upper and lower pressure rollers 37, which press the upper and lower belts 30, 24 into intimate contact with the coal slurry, compressing the coal slurry 50 (See FIG. 3) against the water permeable side 58 of the belts. As explained in more detail later, the coal slurry 50 is dewatered, and a coal cake forms on the water permeable side 58 of each of the belts 24, 30. As shown in FIG. 4, this coal cake 50 is scraped off of the permeable side of each of the belts 24, 30 with the aid of scraper blades 38, and falls onto a conveyor belt which transports the cake on to the next stage in the coal slurry dewatering process 10.

The belts 24, 30 continue traveling, which each belt 24, 30 going through a respective wringing station 40, 42, where the water in the absorbent layer of each belt 24, 30 is squeezed out, as explained later. FIG. 5 shows the wringing station 42 for the upper belt 30. The belt 30 is squeezed between two idler rollers 44 and a motorized roller 32. Water is squeezed out of the belt 30 and is collected in a trough 46. This water may be reused in the preparation of additional coal slurry, if desired. The wringing station 40 for the lower belt 24 is similar to the wringing station 42 for the upper belt 30.

Figure 3:
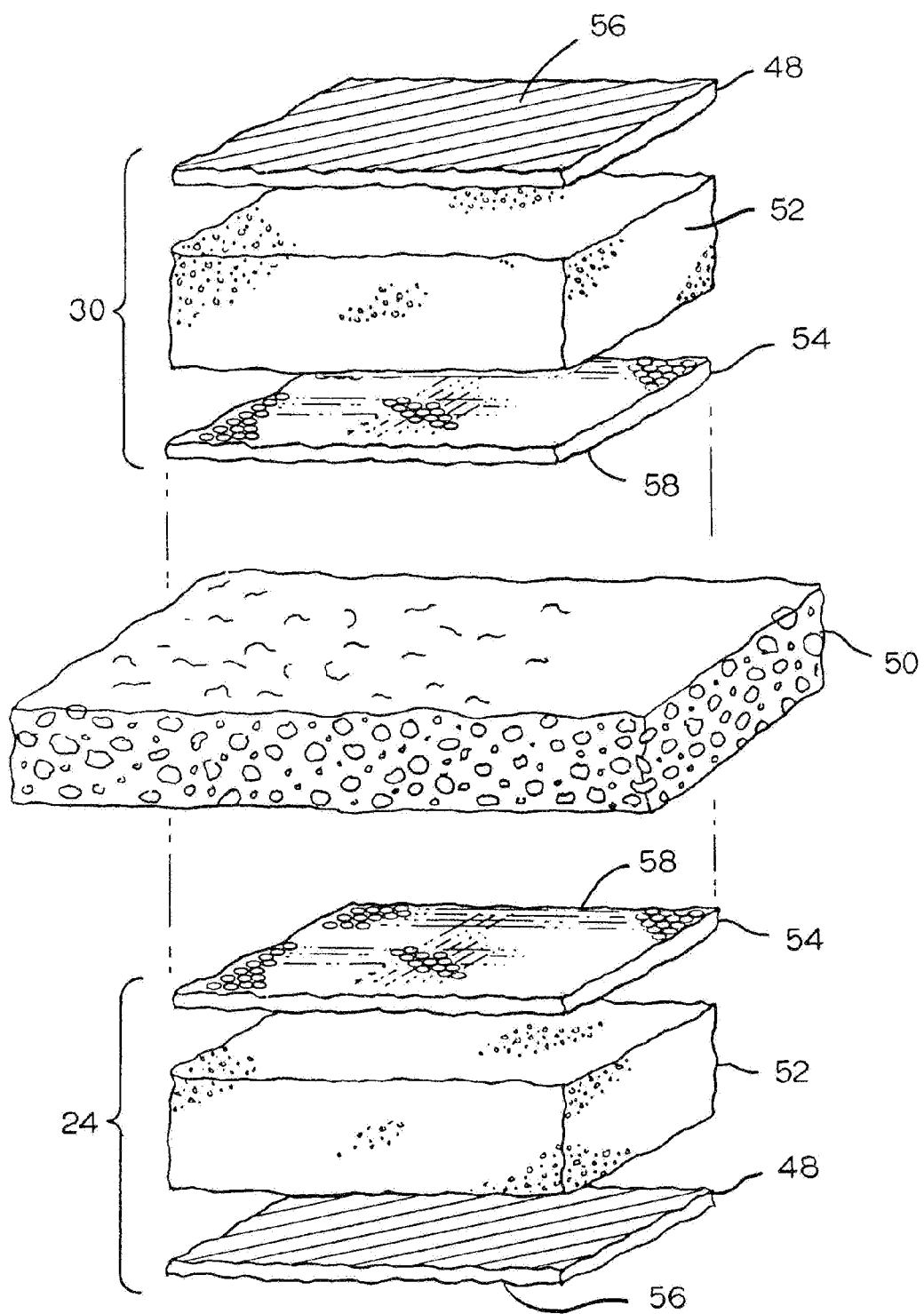
FIG. 3 is an exploded section view along line 3-3 of FIG. 2.

Referring to FIG. 3, the upper and lower belts 30, 24 are depicted as each having three layers: an impermeable layer 48 (farthest away from the coal slurry 50), an intermediate absorbent layer 52 in contact with the impermeable layer 48, and a porous layer 54 in contact with the absorbent layer 52 on one side and with the coal slurry 50 on the other side. While these layers 48, 52, 54 are depicted here as separate layers, being made of different materials, that is not required. For instance, the absorbent material 52 may have small enough pores to provide the screening function of the porous layer 54 as well as the absorbent function, so that only water can get through the pores, with the solids from the coal slurry being too large to get through the pores. In that case, an additional porous layer 54 may be omitted. Likewise, the absorbent layer 52 may be treated on its second side to briefly melt the surface and seal the pores, rendering that side of the absorbent layer 52 impermeable. In any case, each belt 24, is a conveyor belt having first and second sides, the first side 56 being water-impermeable and the second side 58 having pores and being water-permeable, wherein the water-permeable 58 side feeds a layer of water-absorbent material 52.

Referring to FIG. 5, as the belts 24, 30 proceed to their respective wringing stations 40, 42, they are squeezed between the idler rollers 44 and the motorized roller 32. As each belt 24, 30 is squeezed, the water absorbed by the absorbent layer 52 seeks to exit the belt. Since water cannot freely flow through the impermeable layer 48, the water does not exit through this side 58 of the belt. The avenue available to the absorbed water is through the pores of the porous, water permeable side 58 of the belt.

As the absorbed water escapes through the water permeable side 58, it backflushes coal particles remaining on the water permeable side 58, which were not scraped off by the scraper blades 38 (See FIG. 4). Any small diameter coal particles that may have embedded in the pores are also flushed out, being backwashed in a direction opposite to the direction in which the particles entered to become embedded in the pores to begin with.

As the absorbed water is backflushed out of the belt, it is received in a trough 46 (See FIG. 5) for proper disposal or for further use.

It will be obvious to those skilled in the art that modifications may be made to the embodiments described above without departing from the scope of the present invention as defined by the claims.

What is claimed is:

1. A method for dewatering a coal slurry, comprising the steps of:
    providing a conveyor belt having first and second sides, the first side being water-impermeable and the second side having pores and being water-permeable, wherein the water-permeable side includes a layer of water-absorbent material;
    driving said conveyor belt along a continuous loop which passes through a plurality of stages, including:
    placing a coal slurry containing coal particles and water in contact with the second side of the conveyor belt;
    compressing the coal slurry against the second side of the conveyor belt so that water from the coal slurry is absorbed into the water absorbent layer and the moisture content of the remaining coal slurry is substantially reduced; then
    removing the remaining coal slurry from the conveyor belt; and then
    squeezing the conveyor belt between rollers so as to drive the water that has been absorbed in the water absorbent layer back out the second side of the belt, which also backflushes the pores of the second side to clean out small diameter coal particles that may have embedded in the pores.

2. A method for dewatering a coal slurry as recited in claim 1, wherein two of said conveyor belts are provided, and the step of compressing the coal slurry against the second side of the conveyor belt includes sandwiching the coal slurry between the second sides of both of the conveyor belts.

* * * * *

UNITED STATES PATENT AND TRADEMARK OFFICE
CERTIFICATE OF CORRECTION

PATENT NO. : 8,871,099 B1
APPLICATION NO. : 13/646934
DATED : October 28, 2014
INVENTOR(S) : Fred H. Green and Raymond A. Miller Page 1 of 1

It is certified that error appears in the above-identified patent and that said Letters Patent is hereby corrected as shown below:

In the Claims
Column 4, line 35, delete "small diameter".

Signed and Sealed this
Tenth Day of February, 2015

Michelle K. Lee
*Deputy Director of the United States Patent and Trademark Office*